Jan. 6, 1948.　　　Z. W. KELLEY　　　2,434,075
TOOLHOLDER
Filed May 2, 1944　　　2 Sheets-Sheet 1

INVENTOR.
ZAR W. KELLEY.
BY Fay, Gobrick, Chilton & Isler
Attorneys.

Jan. 6, 1948.  Z. W. KELLEY  2,434,075
TOOLHOLDER
Filed May 2, 1944  2 Sheets-Sheet 2

INVENTOR.
ZAR W. KELLEY.
BY Fay, Golrick, Chilton & Soler
attorneys.

Patented Jan. 6, 1948

2,434,075

UNITED STATES PATENT OFFICE 2,434,075

TOOLHOLDER

Zar W. Kelley, Bedford, Ohio, assignor to Z & W Machine Products, Inc., Cleveland, Ohio, a corporation of Ohio Application May 2, 1944, Serial No. 533,814

12 Claims. (Cl. 10—89)

This invention relates, as indicated, to a tool holder, but has reference more particularly to a tap and die holder for multiple spindle automatics.

Various types of releasing tap and die holders have heretofore been available but each has one or more defects which makes the holder relatively short-lived. The most common of these defects is the frictional wear between and breakage of the teeth of the clutch elements which occurs at the conclusion of the threading operation and during the unthreading of the work from the tap or die, this wear and breakage being due primarily to the failure to provide sufficient clearance between the teeth of the clutch elements at the time when such clearance is needed.

This wear and breakage greatly reduces the useful life of a holder, and becomes a serious problem, both from the standpoint of cost and from the standpoint of production, since the removal of a single tool from a multiple spindle automatic requires shutting down of the entire machine until the holder can be repaired or replaced.

The present invention has as its primary object the provision of a holder of the character described, which is of rugged, simple construction, and in which means have been provided for automatically producing an appreciable clearance between the teeth driving and driven parts of the holder at the conclusion of the threading or other operation and maintaining such clearance during the removal or unthreading of the work from the tool.

Another object of the invention is to provide a holder of the character described in which an effective clutch arrangement is provided between driving and driven parts of the holder.

A further object of the invention is to provide a holder of the character described which is devoid of couplings or connections of insufficient cross-sectional area to permit drive between the parts without danger of breakage or failure at these points.

Other objects and advantages of the invention will be apparent during the course of the following description.

In the accompanying drawings, forming a part of this specification, and in which like numerals are employed to designate like parts throughout the same, Fig. 1 is a view, partly in elevation and partly in section, showing the tap and die holder in its condition, prior to the beginning of the tapping operation;

Figure 1:
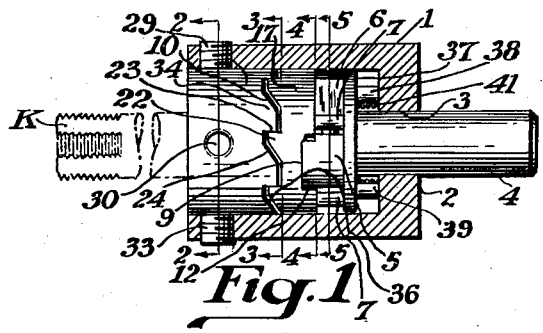
Figure 2:
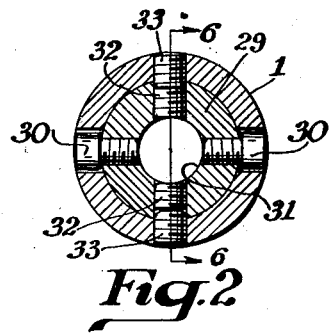
Fig. 2 is a cross-sectional view, taken on the line 2—2 of Fig. 1.
Figure 3:
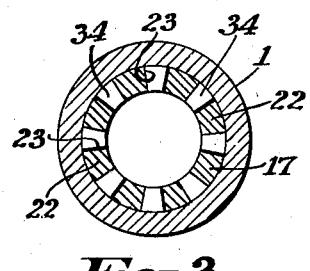
Fig. 3 is a cross-sectional view, taken on line 3—3 of Fig. 1.
Figure 4:
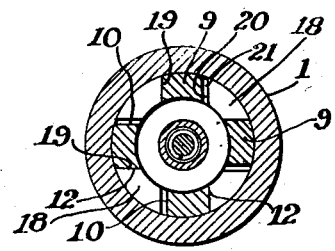
Fig. 4 is a cross-sectional view, taken on the line 4—4 of Fig. 1.

Referring more particularly to the drawings, the tap and die holder will be seen to comprise a cylindrical shell or sleeve 1 having an inwardly extending flange 2 at the rear thereof, providing a bore 3, through which extends the stem or shank 4 of a clutch member 5, which is disposed within the shell 1.

The clutch member 5 is of a diameter corresponding with the internal diameter of the sleeve 1 and has a sliding fit in the latter. It is of the over-running clutch type, having in its periphery a multiplicity of circumferentially-spaced recesses 6 in which are disposed rollers 7, which are normally urged, by means of spring pressed pins 8, in a direction towards the inner surface of the sleeve 1. When the clutch member is moved relatively to the sleeve in the direction indicated by the arrow in Fig. 5, the clutch member is free to rotate relatively to the sleeve, but when the clutch member is moved in the opposite direction relatively to the sleeve, the rollers 7 become wedged between the walls of the recesses 6 and the inner wall of the sleeve, locking the sleeve and clutch member together. The operation of the clutch will be further described in connection with the operation of the device as a whole.

The clutch member 5 is further provided with teeth or lugs 9, which extends in an axial direction from the portions of the clutch member 5 intermediate the recesses 6 thereof. These teeth or lugs are provided at one side thereof with surfaces 10 disposed at right angles to the plane of the clutch member 5 and terminate in beveled corners or surfaces 11, and are provided at the other side thereof with surfaces 12 which are substantially parallel with the surfaces 10.

The shank 4 of the clutch member 5 is provided with an internally-threaded opening 13 which is counterbored as at 14 for the reception of a bushing 15 provided with a flange 16. Mounted on the bushing 15 is a second clutch member 17 which comprises a ring having lugs or teeth 18 projecting from one side thereof. The teeth or lugs 18 are provided at one side thereof with surfaces 19 disposed at right angles to the plane of the clutch member 17 and designed to coact with the surfaces 12 of the teeth 9, and are provided at the opposite side thereof with surfaces 20 substantially parallel with the surfaces 10 of the teeth 9 and designed to coact with the latter surfaces, and with beveled surfaces 21 substantially parallel with the beveled surfaces 11, but somewhat longer than the latter.

It will be noted that the teeth 9 extend into the spaces between the teeth 18, but are somewhat shorter in circumferential length than the latter, thereby permitting a slight circumferential movement of the clutch member 5 relatively to the clutch member 17, for a purpose to be presently described.

The ring-like clutch member 17 has circumferentially-spaced teeth 22 projecting from the other side thereof, said teeth having surfaces 23 at one side thereof disposed in planes diametral of said clutch member and beveled surfaces 24 at the other side thereof.

The clutch members 5 and 17 are maintained in assembled relation by means of the flange 16 of the bushing 15 which engages that side of the clutch member from which the teeth 22 project, the bushing, in turn, being secured to the clutch member 5 by means of a socket-headed screw 25, which is threaded into the opening 13 of the shank 4, the bushing being counterbored as at 26 for the reception of a compression coil spring 27, one end of which bears against a shoulder 28 at the base of the counterbore 26 and the other end of which bears against the head of the screw 25. The spring, due to its bearing against the shoulder 28 of the bushing tends to normally maintain the clutch members 5 and 17 in such engagement with each other that the surfaces 12 of the teeth 9 abut the surfaces 19 of the teeth 18, but permits a slight axial displacement of one of the clutch members relatively to the other in the course of the operation of the device which will be presently described.

The device further includes a holder 29 which is rigidly secured within the end of the sleeve 1 by means of set-screws 30 which extend through the sleeve and holder. The holder 29 is recessed as at 31 for the reception of a tap, indicated by reference number T or a button-die (not shown). The tap or die is retained in the holder by means of set-screws 32 extending through the holder and into engagement with the tap or die, and which are locked in position by lock-screws 33, extending through the sleeve 1, into the holder 29 and into engagement with the set-screws 32.

The holder 29 is provided on its rear face with clutch teeth 34 designed to coact with the clutch teeth 22 and having surfaces 35 at one side thereof disposed in planes diametral of said holder and beveled surfaces 36 at the other side thereof.

Interposed between the clutch member 5 and the flange 2 of the sleeve 1 is a follower plate or ring 37 having a pair of diametrically-opposed pins 38 and 39 projecting from one face thereof and extending into openings 40 in the flange 2, in which openings the pins have a sliding fit. The pins serve to prevent relative rotation between the sleeve and follower, while permitting the follower to move axially in the sleeve. A plurality of compression coil springs 41 are interposed between the follower ring 37 and the flange 2 of the sleeve 1, and these rings exert sufficient pressure on the follower plate to cause the latter, in turn, to maintain the clutch members 5 and 17 in engagement with the holder 29, that is to say, the teeth 22 of the clutch member 17 in engagement with the teeth 34 on the holder 29.

Figure 5:
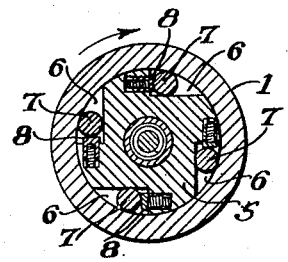
Fig. 5 is a cross-sectional view, taken on the line 5—5 of Fig. 1.
Figure 6:
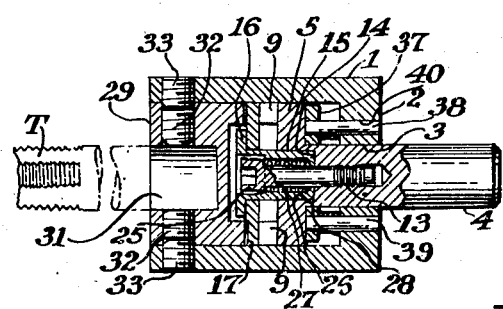
Fig. 6 is a longitudinal cross-sectional view of the holder taken on the line 6—6 of Fig. 2.

Having thus described the general construction of the tap and die holder, the use or operation thereof will now be briefly described:

The tap or die holder is designed to be used in such a manner that the shank 4 is inserted in the turret hole of a turret-type machine tool or multiple-spindle automatic, and is locked or clamped against rotation in such hole, or the shank may be rotated in the direction indicated by the arrow in Fig. 5.

Assuming that the first condition prevails, i. e., that the shank 4 is locked or clamped against rotation, and that the tapping operation is about to begin. The relative position of the parts at this time is shown in Fig. 1, in which it will be noted that the teeth 22 of the clutch member 17 are in engagement with the teeth 34 on the holder 29 and the teeth 9 of the clutch member 5 are in engagement with the teeth 18 on the clutch member 17, with the surfaces 12 of the teeth 9 in abutment with the surfaces 19 of the teeth 18.

Figure 7:
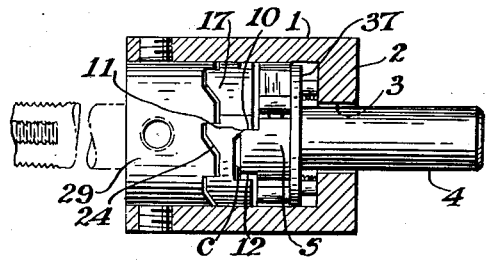
Fig. 7 is a view similar to Fig. 1, but showing the parts in the position they occupy immediately after the beginning of the tapping operation.

With the tap holder in such condition, the work which is to be tapped, and which is mounted in such a manner as to rotate in a direction opposite to that of the arrow in Fig. 5 is brought into engagement with the tap T, producing a torque on the sleeve 1, which causes the beveled surfaces 21 of the teeth 18 to ride along the beveled surfaces 11 of the teeth 9 until the surfaces 20 engage the surfaces 10. This displaced the clutch member 17 against the action of the spring 27, providing a clearance C between the ends of the teeth 9 and the clutch member 17, as shown in Fig. 7.

Figure 8:
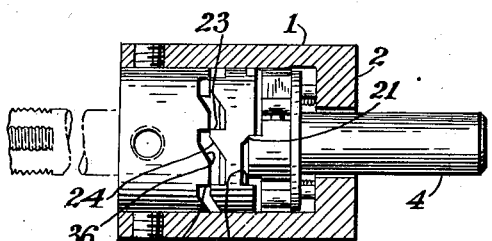
Fig. 8 is a view similar to Fig. 7, but showing the relative position of the parts just prior to the end of the tapping operation.
Figure 9:
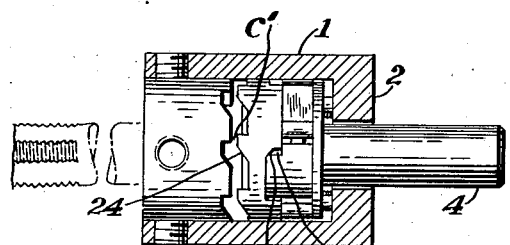
Fig. 9 is a view similar to Fig. 8, but showing the relative position of the parts at the conclusion of the tapping operation
Figure 10:
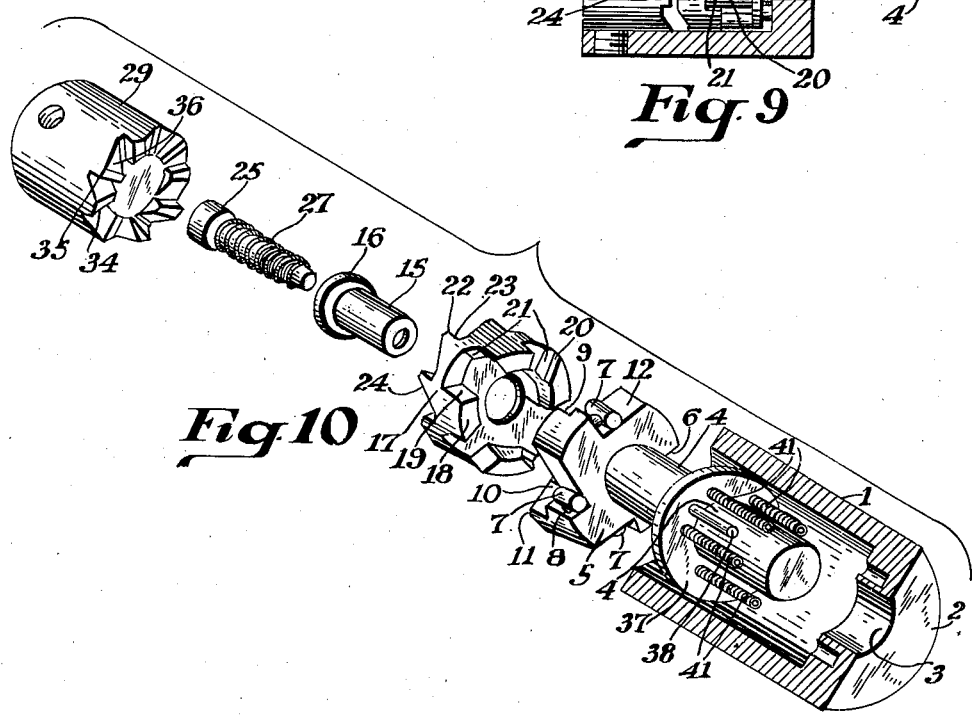
Fig. 10 is an exploded view of the tap and die holder.

When the tapping operation is almost completed, a stop, not shown, prevents further forward movement of the shank 4 and thereby causes the holder 29 and therefore the sleeve 1 to move axially relatively to the shank 4, causing the teeth 34 of the holder to recede from the clutch teeth 22 as shown in Fig. 8. As soon as the teeth 34 have cleared the teeth 22, the spring 27 causes the clutch member 17 to snap back to its initial position, providing, as shown in Fig. 9, a clearance C' between the ends of the teeth 34 and 22, equivalent in width to the clearance C which previously existed between the teeth 18 and clutch member 17.

This clearance C', which is thus automatically produced, is of extreme importance for it insures against any possibility of wear or friction between the teeth 34 and 22 as the result of subsequent relative rotation between these teeth, the clearance being instantaneously effected.

At this point, the holder 29, and therefore the sleeve 1, will rotate with the work, indicating the completion of the tapping operation. The work is then automatically rotated in an opposite direction so as to unthread it from the tap. During such rotation of the work, the sleeve 1 is maintained stationary, due to the fact the rollers 7 become wedged between such sleeve and the clutch member 5, and prevent rotation of the sleeve in the direction in which the work is rotating.

As soon as the work has become disengaged from the tap, the springs 41, which, during the foregoing operations, have become compressed between the follower 27 and flange 2, act to cause the parts to return to their normal position, which has been previously described.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a tool holder of the character described, a clutch member having teeth disposed on opposite faces thereof, the teeth of one face having axially extending surfaces terminating in camming faces at the roots thereof, a tool holding member having clutch teeth thereon in engagement with teeth on one face of said clutch member, a second clutch member having teeth thereon adapted to engage teeth on the other face of said first-named clutch member, the teeth of one of the members, coacting with said first-named clutch member, having axially extending surfaces adapted to move over said camming faces and bear against the aforementioned axial surfaces, whereby rotation of said tool holding member causes axial displacement of said tool holding member, and spring means responsive to extended axial movement of said tool holding member relative to said second-named clutch member to cause said first-named clutch member to be vigorously displaced axially thereof whereby to cause increased separation of the other set of coacting teeth.

2. In a tool holder of the character described, a clutch member having teeth thereon, an intermediate clutch member, disposed adjacent said first-named member, having teeth on the opposite faces thereof, the teeth of one face having axially extending surfaces terminating in camming faces at the roots thereof, a tool holding member, having clutch teeth thereon, engaging the teeth of one face of said intermediate clutch member, the teeth of one of said members, coacting with said intermediate clutch member, having surfaces adapted to move on said camming faces and engage said axial surfaces whereby a torque on said tool holding member causes a slight axial displacement of said tool holding member relative to said first-named clutch member, and spring means, responsive to extended axial movement of said tool holding member relative to said first-named clutch member, adapted to cause a slight axial displacement of said intermediate clutch member, linearly equivalent to the aforesaid slight axial displacement of said tool holding member, whereby to cause increased separation of the other set of coacting teeth.

3. In a tool holder of the character described, a tool holding member having clutch teeth thereon, an intermediate clutch member having teeth on opposite faces thereof, with the teeth on one face engaging the teeth on said holding member, a second clutch member having teeth thereon in engagement with teeth on the intermediate clutch member, the teeth on one face of said intermediate clutch member having axially extending surfaces terminating in camming faces at the roots thereof, the teeth, of one of the members coacting with said intermediate clutch member, being movable over said camming faces upon application of torque to provide relatively limited initial axial movement therebetween and having corresponding axially extending surfaces to bear against the aforementioned axial surfaces and maintain said member against rotation relative to said intermediate clutch member, and spring means, responsive to extended axial movement of said tool holding member relative to one of said clutch members, to cause said intermediate clutch member to be vigorously displaced axially thereof to cause full separation of the other set of coacting teeth.

4. In a tool holder of the character described, a cylindrical shell having an inwardly extending flange at one end, a tool holding element, having clutch teeth thereon, rigidly secured in the other end of said shell, a clutch member of the overrunning type mounted in said shell and having a shank projecting through the opening formed by said flange, said clutch member automatically permitting rotation of said shell relatively to said clutch member in one direction but preventing rotation of said shell in the opposite direction, an intermediate clutch member, having teeth on the opposite faces thereof, disposed between and engaging said tool holding member and said first-named clutch member, the teeth on one of said faces having camming surfaces thereon whereby rotation of said tool holding member, relative to said first-named clutch member, in the direction permitted by said first-named clutch member, causes axial displacement of said tool holding member, and spring means, operative upon the separation of the teeth of one of said members from the teeth of said intermediate clutch member, adapted to cause an immediate clearance between said separated teeth.

5. In a tool holder of the character described, a tool holding element having teeth thereon, a clutch member having teeth thereon engageable by the teeth of said element, whereby rotation of said element causes rotation of said clutch member, a second clutch member in engagement with said first clutch member, said first clutch member being movable axially upon said rotation of said first clutch member to provide a clearance between said clutch members, and means operative upon disengagement of the teeth of said element from the teeth of said first clutch member to cause said first clutch member to close said clearance and provide a second clearance, equivalent in size to said first clearance between the teeth of said element and first clutch member.

6. In a tool holder of the character described, a tool holding element having teeth thereon, a clutch member having teeth thereon engageable by the teeth of said element, whereby a torque on said element produces a slight rotation of said clutch member, a second clutch member disposed adjacent said first clutch member, cam means on said first clutch member operative upon said rotation of said first clutch member to axially displace said first clutch member from said second clutch member, and spring means operative upon disengagement of the teeth of said holder element from the teeth of said first clutch member to cause said first clutch member to snap into engagement with said second clutch member, whereby to close the clearance between said clutch members and provide a like clearance between the teeth of said holder and said first clutch member.

7. A holder as defined in claim 6, in which said cam means comprises beveled surfaces on said first clutch member.

8. A holder as defined in claim 6, in which said second clutch member is of the overrunning type.

9. In a tool holder of the character described, a cylindrical sleeve having an inwardly extending flange at one end, a tool receiving element rigidly secured in the other end of said sleeve, a clutch member disposed adjacent said element, said element and member having teeth adapted for interengagement with each other, clutch means operative to permit rotation of said element in one direction but preventing rotation of said element in the other direction, said element and member being separable from each other to cause disengagement of said teeth, and means responsive to said separation to produce an appreciable clearance between said teeth immediately upon said separation.

10. In a tool holder of the character described, a cylindrical shell having an inwardly-extending flange at one end, a tool-receiving element rigidly secured in the other end of said shell, said element having clutch teeth thereon, a clutch member of the overrunning type mounted in said shell and having a shank projecting through the opening formed by said flange, said clutch member permitting rotation of said shell relatively to said clutch member in one direction but preventing rotation of said shell in the opposite direction, a second clutch member disposed between said holder element and first clutch member and having teeth engageable by the teeth of said element, and spring means normally urging said second clutch member into engagement with said first clutch member.

11. A tool holder as defined in claim 10, in which rotation of said shell in the direction permitted by said first-named clutch member causes a slight axial movement of one of said clutch members relatively to the other.

12. A tool holder as defined in claim 10, in which rotation of said shell in the direction permitted by said first-named clutch member causes a slight axial movement of one of said clutch members relatively to the other, and in which disengagement of the teeth of said element from said second clutch member permits said spring means to restore said clutch members to their normal position of engagement with each other.

ZAR W. KELLEY.

REFERENCES CITED

The following references are of record in the file of this patent:

UNITED STATES PATENTS

| Number | Name | Date |
| --- | --- | --- |
| 1,164,315 | Procunier | Dec. 14, 1915 |
| 1,401,594 | Drowns | Dec. 27, 1921 |
| 2,206,047 | Poorman | July 2, 1940 |
| 2,356,669 | Hook | Aug. 22, 1944 |
| 2,147,203 | Kylin | Feb. 14, 1939 |

FOREIGN PATENTS

| Number | Country | Date |
| --- | --- | --- |
| 133,133 | Great Britain | Sept. 29, 1919 |